(12) United States Patent
Erickson et al.

(10) Patent No.: US 7,095,609 B2
(45) Date of Patent: Aug. 22, 2006

(54) ROBUST INTUITIVE LATCHING MECHANISM

(75) Inventors: Vernon D. Erickson, Dakota Dunes, SD (US); David R. Davis, Jefferson, SD (US); Derek T. Nguyen, San Clemente, CA (US); Cesar Daniel Castillo, El Paso, TX (US); Armando Rocha, Canutillo, TX (US); Richard A. Gibson, El Paso, TX (US)

(73) Assignee: Gateway Inc., Irvine, CA (US)

( * ) Notice: Subject to any disclaimer, the term of this patent is extended or adjusted under 35 U.S.C. 154(b) by 298 days.

(21) Appl. No.: 10/404,798

(22) Filed: Apr. 1, 2003

(65) Prior Publication Data

US 2004/0196623 A1 Oct. 7, 2004

(51) Int. Cl.
 *G06F 1/16* (2006.01)

(52) U.S. Cl. .................. 361/683; 361/679; 361/727; 312/223.2

(58) Field of Classification Search ......... 361/683–686, 361/724–727, 740, 759, 831; 292/42, 126, 292/19, 128, 151, 148, 207, DIG. 37–DIG. 38; 312/223.1, 223.2, 223.3, 204, 257.1, 217–218, 312/263–265, 351; 348/836; 206/706; 248/551–553; 220/4.02, 812, 216–218, 4.28, 4.31
See application file for complete search history.

(56) References Cited

U.S. PATENT DOCUMENTS

| | | | | |
|---|---|---|---|---|
| 5,116,261 A | * | 5/1992 | Lan et al. | 312/292 |
| 5,162,976 A | * | 11/1992 | Moore et al. | 361/683 |
| 5,751,545 A | * | 5/1998 | Jung | 361/683 |
| 5,825,626 A | | 10/1998 | Hulick et al. | 361/724 |
| 5,918,956 A | | 7/1999 | Scholder | 312/223.2 |
| 5,967,633 A | * | 10/1999 | Jung | 312/223.2 |
| 5,997,115 A | | 12/1999 | Radloff et al. | 312/222 |
| 6,053,586 A | * | 4/2000 | Cook et al. | 312/223.2 |
| 6,134,116 A | | 10/2000 | Hoss et al. | 361/747 |
| 6,257,682 B1 | * | 7/2001 | Liu et al. | 312/223.2 |
| 6,297,948 B1 | * | 10/2001 | Buican et al. | 361/683 |
| 6,354,680 B1 | * | 3/2002 | Lin et al. | 312/223.2 |
| 6,373,690 B1 | * | 4/2002 | Buican et al. | 361/683 |
| 6,373,692 B1 | * | 4/2002 | Cheng | 361/683 |
| 6,375,287 B1 | * | 4/2002 | Lai | 312/223.2 |
| 6,398,325 B1 | * | 6/2002 | Chen et al. | 312/223.2 |
| 6,407,912 B1 | * | 6/2002 | Chen et al. | 361/683 |
| 6,542,356 B1 | * | 4/2003 | Gan | 361/683 |
| 6,775,144 B1 | * | 8/2004 | Gan et al. | 361/727 |
| 2003/0081399 A1 | * | 5/2003 | Davis et al. | 361/818 |

* cited by examiner

*Primary Examiner*—Michael Datskovskiy
(74) *Attorney, Agent, or Firm*—Kevin West; Suiter-West-Swantz

(57) ABSTRACT

A robust intuitive latching mechanism for securing an access panel to a chassis of an electronic device comprises a hook engagement member for engaging a hook coupled to the chassis to secure the access panel to the chassis. A spring member couples the hook engagement member to the access panel. The spring member is capable of flexing between a first position wherein the hook engagement member is engaged with the hook and a second position wherein the hook engagement member is disengaged from the hook. A handle assembly is mounted to at least one of the hook engagement member and the spring member for flexing the spring member. The handle assembly is actuated for flexing the spring member from the first position to the second position for disengaging the hook engagement member from the hook to allow the access panel to be removed from the chassis.

25 Claims, 5 Drawing Sheets

ROBUST INTUITIVE LATCHING MECHANISM

FIELD OF THE INVENTION

The present invention generally relates to electronic devices such as computers and the like, and particularly, to a latching mechanism for securing the access door of such an electronic device to the chassis of the device.

BACKGROUND OF THE INVENTION

In the past, removal of the access panel or cover to the chassis of an electronic device such as a computer, or the like, was cumbersome or time consuming. In most applications, the access panel is mounted to the chassis using fasteners such as thumb screws, or the like, which must be unscrewed each time the access panel is removed from the chassis. The access panel may then be lifted or slid from the chassis to provide access to components located therein. More recently, quick release latching systems have been provided for securing the access panel to the chassis of the computer. Typically, such latching systems also push the access panel open when the latching mechanism is defeated, making the access panel easier to remove by users.

In modern computer manufacturing facilities, vacuum lifting is often used for lifting the computer to place the computer in packaging prior to delivery. However, when vacuum lifting is employed with a computer chassis that utilizes a quick release latching system that pushes the access panel of the computer open, the access panel can be inadvertently pulled from the chassis of the computer, causing the computer to be dropped and possibly damaged. Generally, this problem occurs because the devices that defeat the latching mechanism are actuated by forces that are applied normal to the access panel during vacuum lifting. The latching mechanism then works in concert with the forces applied during the vacuum lifting process to separate the access panel from the chassis.

Consequently, it would be desirable to provide a quick release latching mechanism that allows the access panel of a computer or similar electronic device to be easily removed from its chassis, but which is not susceptible to inadvertent actuation during processes, such as vacuum lifting, that apply forces to the access panel.

SUMMARY OF THE INVENTION

Accordingly, the present invention is directed to a robust intuitive latching mechanism for securing an access panel to a chassis of an electronic device such as a computer or the like. The latching mechanism allows the access panel of a computer or similar electronic device to be easily removed from its chassis, but is not susceptible to inadvertent actuation during processes, such as vacuum lifting, that apply forces to the access panel. In one embodiment, the latching mechanism comprises a hook engagement member for engaging a hook coupled to the chassis to secure the access panel to the chassis. A spring member couples the hook engagement member to the access panel. The spring member is capable of flexing between a latched position, wherein the hook engagement member is engaged with the hook, and an unlatched position, wherein the hook engagement member is disengaged from the hook. A handle assembly is coupled to at least one of the hook engagement member and the spring member for flexing the spring member. The handle assembly is actuated for flexing the spring member from the first position to the second position for disengaging the hook engagement member from the hook to allow the access panel to be removed from the chassis. Preferably, when the handle assembly is actuated, the hook engagement member is disengaged from the hook allowing the access panel to be removed. However, the access panel is not pushed open by the latching mechanism and remains closed until removed.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
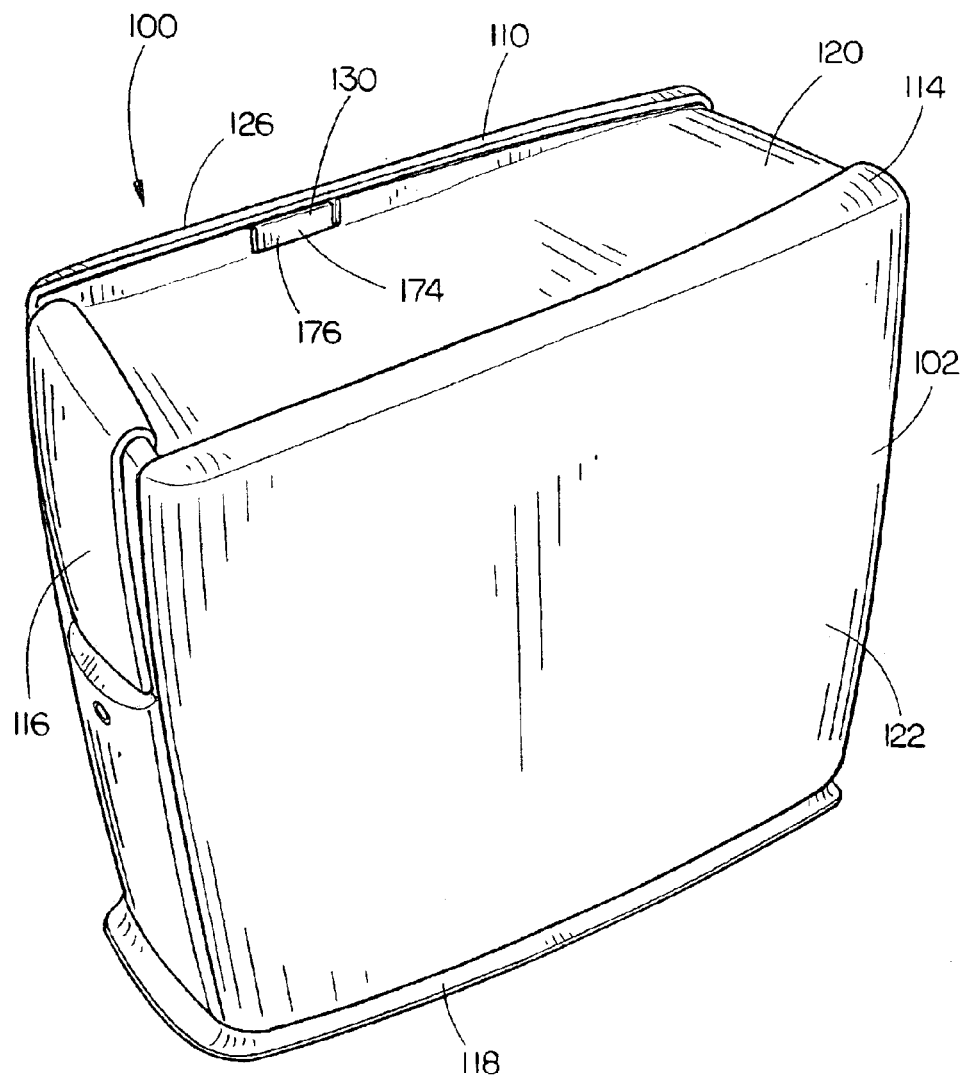
FIG. 1 is an isometric view of a computer having a computer chassis including a latching mechanism in accordance with an exemplary embodiment of the present invention.
Figure 2:
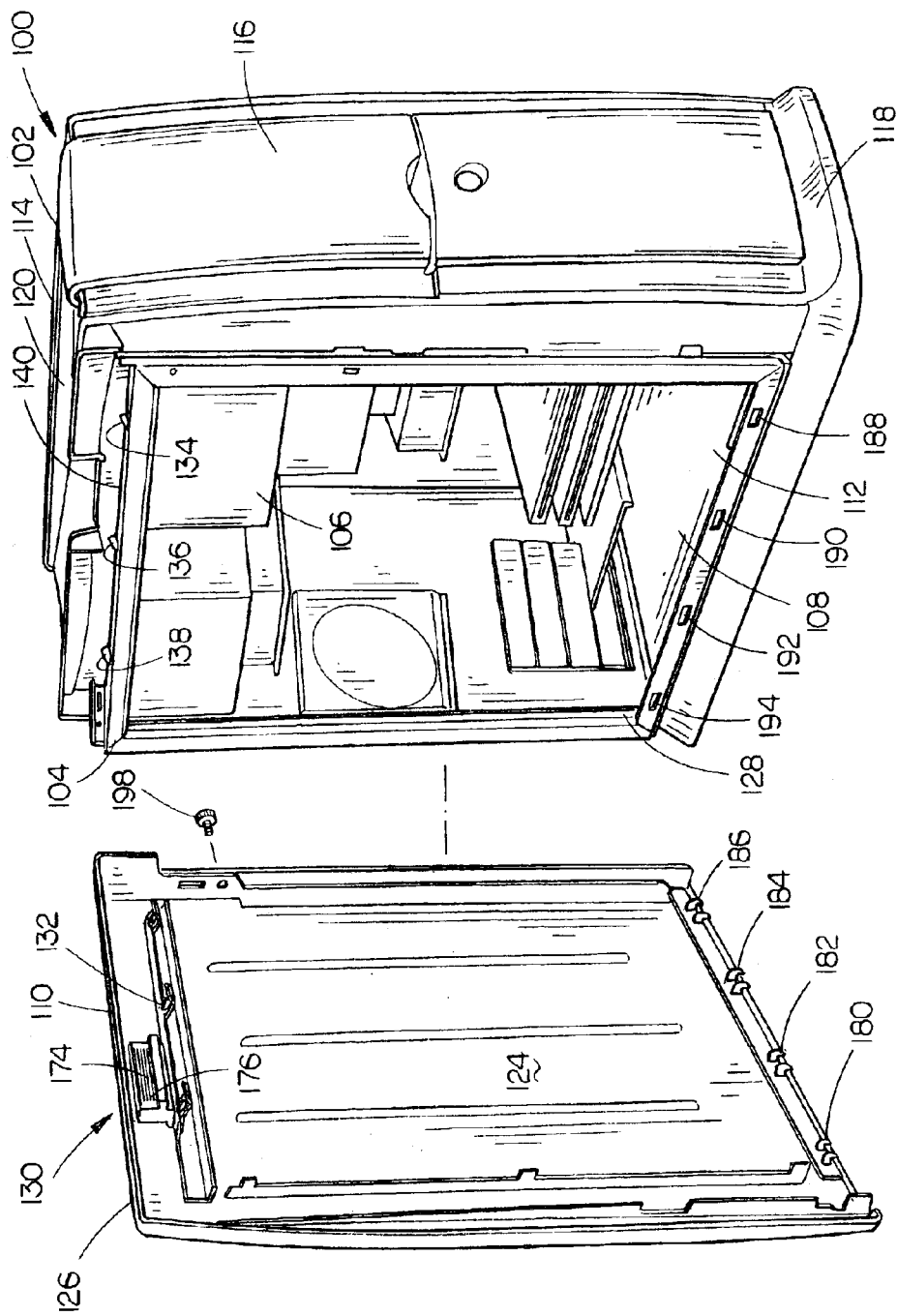
FIG. 2 is an exploded isometric view of the computer shown in FIG. 1, wherein the access panel is removed from the chassis of the computer.

Referring generally to FIGS. 1 through 6, a robust intuitive latching mechanism in accordance with an exemplary embodiment of the present invention is described. FIGS. 1 and 2 illustrate an electronic device 100 having a case 102 including a chassis 104 housing internal components 106 of electronic device 100. In accordance with the present invention, chassis 104 is provided with an opening 108 for providing access to the enclosed components 106. A removable access panel or cover 110 attaches to chassis 104, covering opening 108 to substantially enclose internal components 106 to protect the components from environmental contaminants and/or to prevent Electromagnetic Interference (EMI) emissions through opening 106. For example, in the embodiment illustrated in FIGS. 1 and 2, chassis 104 includes a boxlike frame 112 enclosed by an aesthetic housing 114 having a front bezel assembly 116, a base assembly 118, a top panel 120, and a left side panel 122. As shown in FIG. 2, opening 108 occupies substantially all of the right side of frame 112 so that access panel 110 forms the left side panel of housing 114. Preferably, frame 112 is fabricated of a conductive sheet metal such as steel, or the like, to reduce EMI emissions through chassis 104, while housing 114 may be fabricated of plastic, metal, a composite, or the like, depending on the particular design requirements of electronic device.

Like chassis 104, access panel 110 comprises a frame enclosure panel 124 formed of a conductive sheet metal such as steel, or the like, shaped to enclose opening 108 for reducing EMI emissions there through. A cover panel 126 is mounted to frame enclosure panel 124, forming part of housing 114 when access panel is attached to chassis 104. Cover panel 126, like housing 114, may be fabricated of plastic, metal, a composite, or the like, depending on the particular design requirements of electronic device 100. EMI seals 128, formed of a spring metal, may be provided about opening 106 to engage frame enclosure panel 124 to further reduce EMI emissions from between frame 112 and frame enclosure panel 124.

In accordance with the present invention, computer case 102 includes a robust intuitive latching mechanism 130 for securing access panel 110 to chassis 104. Latching mechanism 130 allows access panel 110 to be easily removed from chassis 104 by the user. However, the latching mechanism does not eject or push access panel 110 from chassis 104, and thus is less susceptible to inadvertent actuation during processes such as vacuum lifting that may apply forces to access panel 110 normal to the surface of the panel than prior latching mechanisms.

Figure 3:
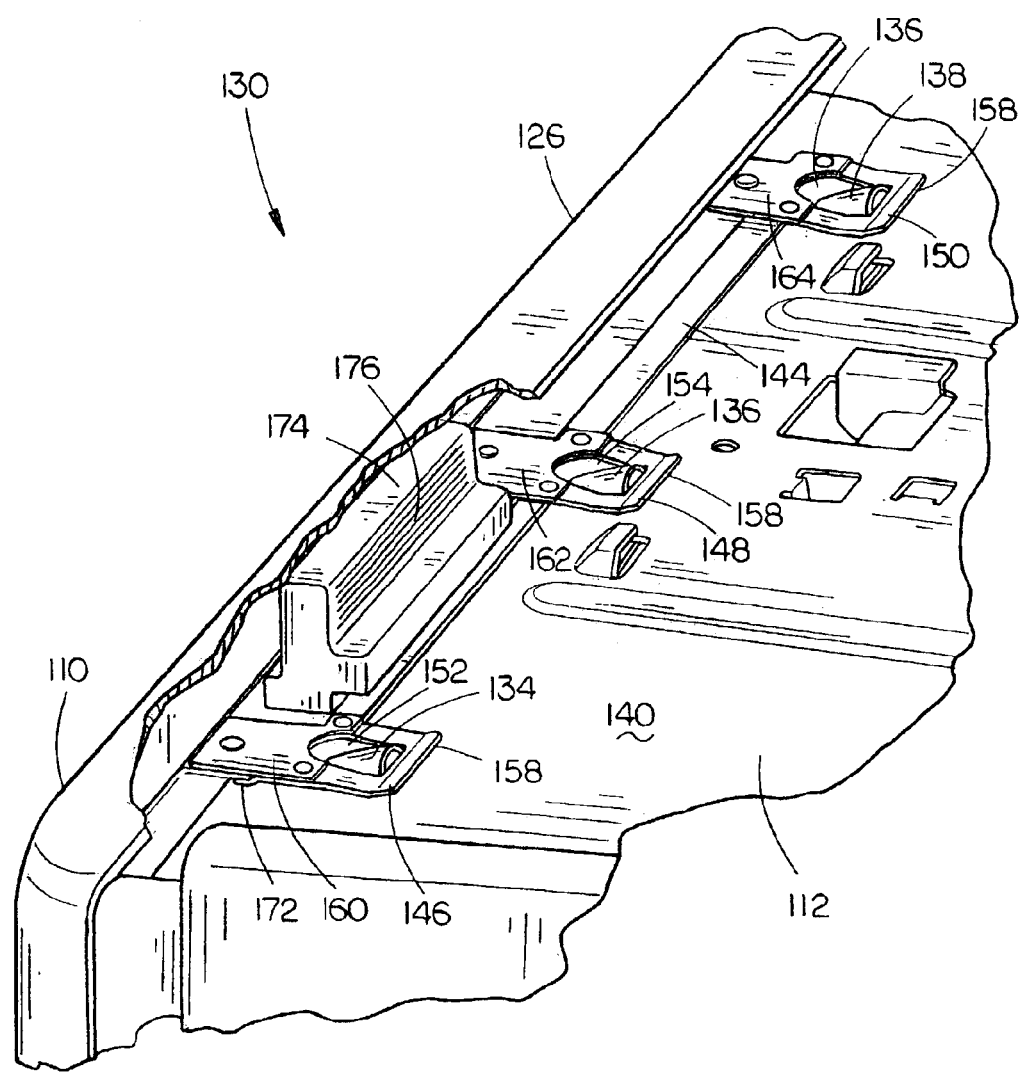
FIG. 3 is a partial cross-sectional isometric view illustrating the latching mechanism of the computer shown in FIG. 1.
Figure 4:
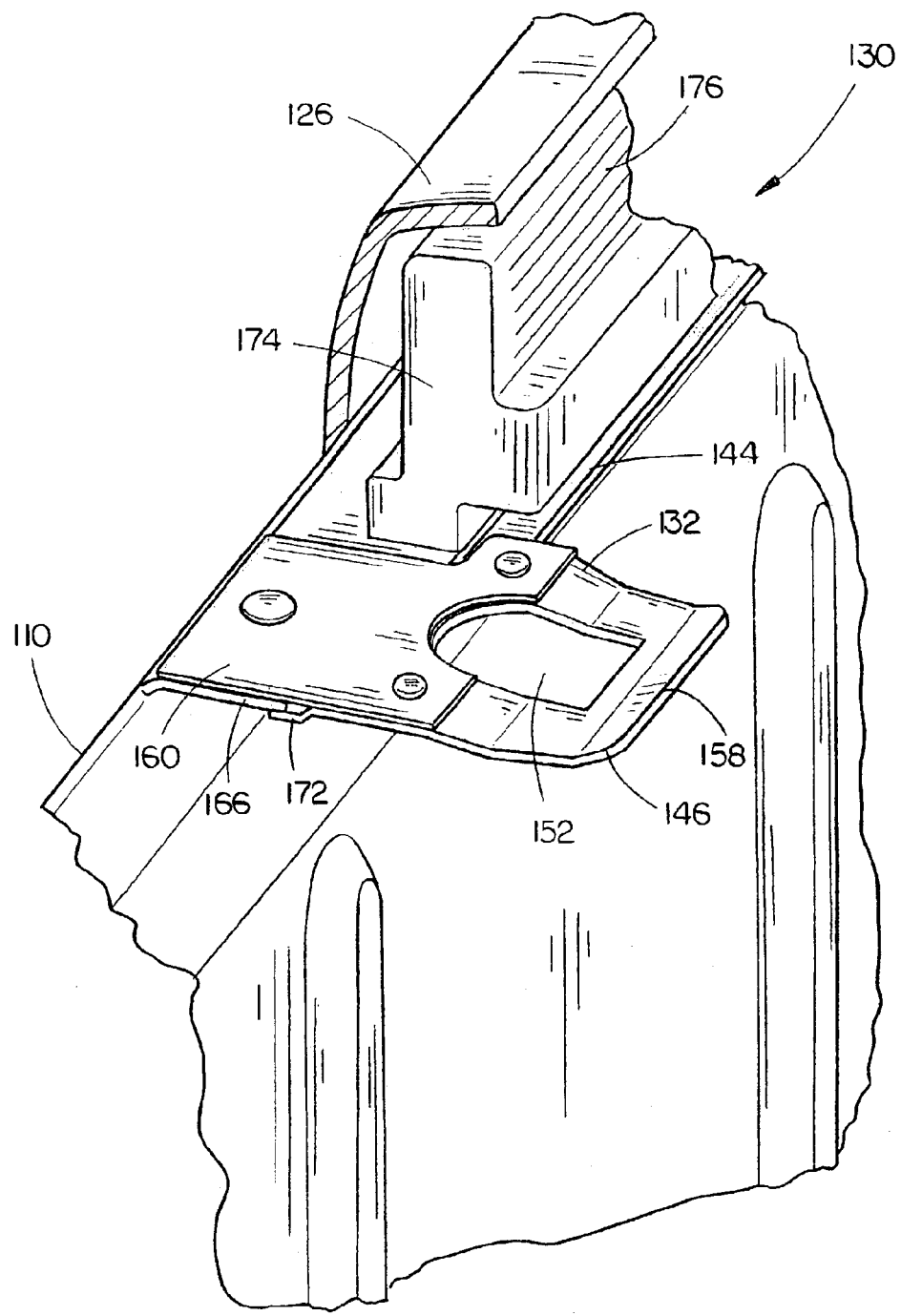
FIG. 4 is a partial cross-sectional isometric view illustrating detail of the latching mechanism shown in FIG. 3.
Figure 5:
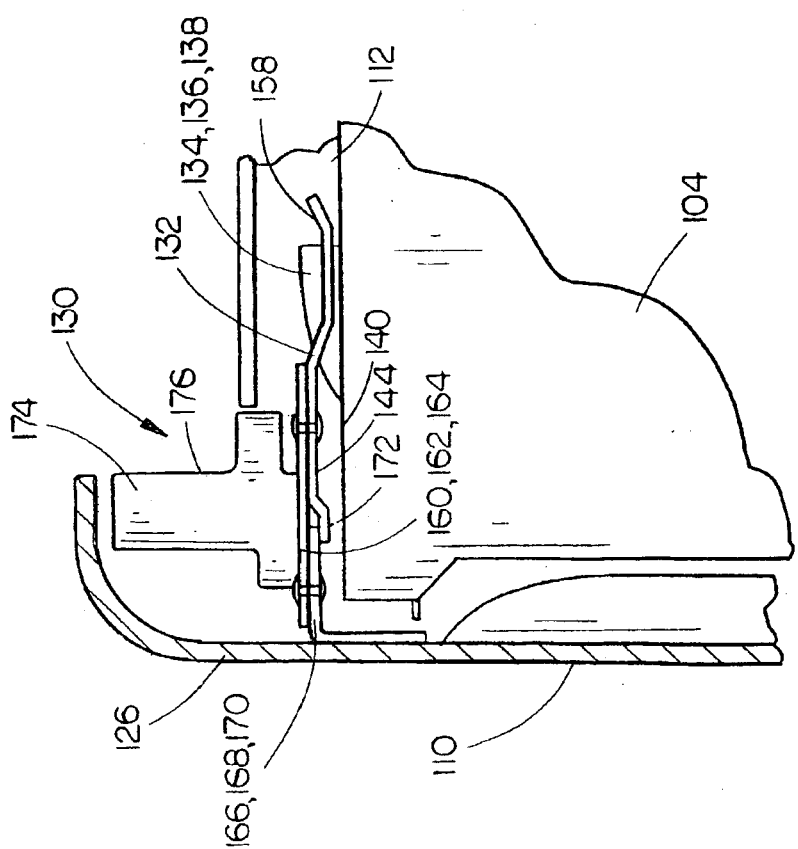

In the embodiment illustrated in FIGS. 2 through 6, latching mechanism 130 comprises a hook engagement member 132, which engages one or more hooks (three generally equally spaced hooks 134, 136 & 138 are illustrated) formed in the top surface 140 of frame 112 to secure access panel 110 to chassis 104. For example, in the embodiment illustrated, hooks 134, 136 & 138 are stamped in surface 140, and are generally half conical, or alternately, half hyperboloidal or half paraboloidal in shape. Hook engagement member 132 comprises a flattened strip or bar 144 having one or more shaped tabs (three shaped tabs 146, 148 & 150 are illustrated) spaced to overlie respective ones of hooks 134, 136 & 138. Shaped tabs 146, 148 & 150 include apertures or openings 152, 154 & 156, sized and shaped to allow hooks 134, 136 & 138 to extend there through when latching mechanism 130 is in the latched position, as shown in FIGS. 3 and 5. Preferably, shaped tabs 146, 148 & 150 further comprise upwardly sloping lips 158, which allow shaped tabs 146, 148 & 150 to slide over the curved surfaces of hooks 134, 136 & 138 as access panel 110 is affixed to chassis 104.

Figure 6:
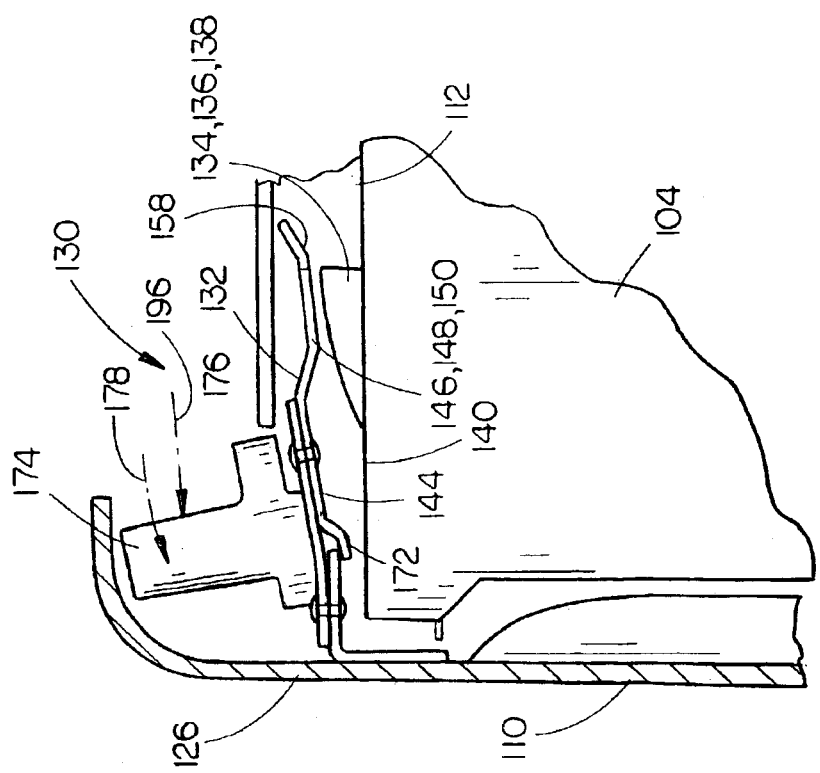
FIGS. 5 and 6 are partial cross-sectional side elevation views illustrating the latching mechanism in the latched and unlatched position.

One or more spring members (three spring members 160, 162 & 164 are illustrated) couple hook engagement member 132 to access panel 110. As shown in FIGS. 4, 5 and 6, each spring member 160, 162 & 164 comprises a flattened strip fabricated of spring steel having a first end affixed to a corresponding tab (three tabs 166, 168 & 170 are illustrated) formed in frame enclosure panel 124 and a second end affixed to flattened strip 144 of hook engagement member 132 adjacent to a shaped tab 146, 148 & 150.

Spring members 160, 162 & 164 are capable of flexing between a first position, shown in FIG. 5, wherein hook engagement member 132 engages hooks 134, 136 & 138, securing access panel 110 to chassis 104, and a second position, shown in FIG. 6, wherein hook engagement member 132 is disengaged from hook 134, 136 & 138. Preferably, spring members 140, 142 & 144 are biased to the first position, shown in FIG. 5, so that latching mechanism 130 remains latched until defeated by a user. In the exemplary embodiment shown, flattened strip 144 includes a lip 172 which overlays the outer ends of tabs 166, 168 & 170. Lip 172 traps the ends of tabs 166, 168 & 170, preventing hook engagement member 132 from being forced downward when access panel 110 which could damage spring members 160, 162 & 164.

A handle assembly 174 is coupled to hook engagement member 132 (or, alternately, one or more spring members 160, 162 & 164), which when actuated, defeats latching mechanism 130 to release access panel 110 from chassis 104. In the exemplary embodiment illustrated, handle assembly 174 is recessed within cover panel 126 of access panel 110 along top panel 120, protecting handle assembly 174 from inadvertent actuation. As shown in FIGS. 5 and 6, handle assembly 174 is actuated by application of a force to (i.e., a user pressing on) surface 176 generally in the direction indicated by line 178 (i.e., in a direction generally away from chassis 104). This application of force to handle assembly 174 flexes spring members 160, 162 & 164, rotating hook engagement member 132 from the latched position, shown in FIG. 1, to the unlatched position, shown in FIG. 6, disengaging hook engagement member 132 from hooks 134, 136 & 138. In this manner, when handle assembly 174 is actuated, hook engagement member 132 is defeated, allowing access panel 110 to be removed.

As shown in FIG. 2, hook members (four pairs of hook members 180, 182, 184 & 186 are illustrated) are provided in along frame enclosure panel 124 of access panel 110. Hook members 180, 182, 184 & 186 engage a corresponding number of slots (four slots 188, 190, 192 & 194 are illustrated) formed in frame 124 along opening 108 to secure the bottom of access panel 110 to chassis 104. Once latching mechanism 130 is defeated, access panel 110 is removed via application of an additional or second force to surface 176 of handle assembly 174 generally in the direction indicated by line 196 (i.e., in a direction generally away from chassis 104). Access panel 110 is then rotated downward, allowing hook members 180, 182, 184 & 186 to be disengaged from slots 188, 190, 192 & 194 so that access panel 110 may be removed from chassis 114. Thus, unlike prior latching systems, access panel 110 is not pushed or kicked open by latching mechanism 130, but instead remains closed until removed via application of additional force to handle assembly 174 by the user.

Access panel 110 is replaced by first engaging hook members 180, 182, 184 & 186 within slots 188, 190, 192 & 194, and then rotating access panel upward until hook engagement member 132 of latching mechanism engages hooks 134, 136 & 138 securing access panel to chassis 104. In embodiments of the invention, an additional fastener 198 such as thumbscrew, or the like, may be provided to further secure access panel 110 to chassis 104 during shipping or transport of the electronic device 100. Preferably, fastener 198 is removed prior to removal of access panel 110.

In the embodiment of the invention shown in FIGS. 1 through 6, electronic device 100 illustrated is characteristic of a personal computer having a tower style case (e.g., a tower or mini-tower case) suitable for enclosing such components as a motherboard and processor, memory, hard disk drive, power supply, floppy disk drives, optical disc drives, cooling fans, and the like. However, it will be appreciated that the robust intuitive latching mechanism of the present invention is not necessarily limited to the specific application illustrated, and it is contemplated that latching mechanisms in accordance with the present invention may be employed by electronic devices other than computers. Such applications include, but are not limited to, network servers, drive storage systems, video or audio equipment, communication equipment, and medical or scientific equipment.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A latching mechanism for securing an access panel to a chassis of an electronic device, comprising:
   a hook engagement member for engaging a plurality of hooks coupled to the chassis to secure the access panel to the chassis;
   a spring member for coupling the hook engagement member to the access panel, the spring member being capable of flexing between a first position wherein the hook engagement member is engaged with the plurality of hooks and a second position wherein the hook engagement member is disengaged from the plurality of hooks; and
   a handle assembly coupled to at least one of the hook engagement member and the spring member for flexing the spring member,
   wherein the handle assembly is actuated for flexing the spring member from the first position to the second position for disengaging the hook engagement member from the plurality of hooks to allow the access panel to be removed from the chassis.

2. The latching mechanism as claimed in claim 1, wherein, when the handle assembly is actuated, the hook engagement member is disengaged from the plurality of hooks while the access panel remains closed.

3. The latching mechanism as claimed in claim 2, wherein the handle assembly is actuated via a force thereto in a direction generally away from the chassis, and wherein the access panel remains closed until an additional force is applied to the handle in a direction generally away from the chassis.

4. The latching mechanism as claimed in claim 1, wherein the hook engagement member includes a plurality of openings for receiving the plurality of hooks when the hook engagement member is engaged with the plurality of hooks.

5. The latching mechanism as claimed in claim 1, wherein the access panel further comprises a tab, the spring member being coupled to the tab.

6. The latching mechanism as claimed in claim 5, wherein the spring member comprises a plate formed of spring steel cantilevered between the tab and the hook engagement member.

7. The latching mechanism as claimed in claim 1, wherein each of the hooks has one of a generally half conical cross-section, a generally half hyperboloidal cross-section, and a generally half paraboloidal cross-section.

8. A case for an electronic device, comprising:
   a chassis for enclosing components of the electronic device, the chassis having an opening for providing access to the enclosed components;
   an access panel for covering the opening in the chassis; and
   a latching mechanism for securing the access panel to the chassis, the latching mechanism including:
      a plurality of hooks coupled to the chassis,
      a hook engagement member having a plurality of openings for engaging the the plurality of hooks to secure the access panel to the chassis,
      a spring member coupling the hook engagement member to the access panel, the spring member being capable of flexing between a first position wherein the hook engagement member is engaged with the plurality of hooks and a second position wherein the hook engagement member is disengaged from the plurality of hooks, and
      a handle assembly coupled to at least one of the hook engagement member and the spring member for flexing the spring member,
   wherein the handle assembly is actuated for flexing the spring member from the first position to the second position for allowing the access panel to be removed from the chassis.

9. The case as claimed in claim 8, wherein, when the handle assembly is actuated, the hook engagement member is disengaged from the plurality of hooks while the access panel remains closed.

10. The case as claimed in claim 9, wherein the handle assembly is actuated via a force applied thereto in a direction generally away from the chassis, and wherein the access panel remains closed until an additional force is applied to the handle in a direction generally away from the chassis.

11. The case as claimed in claim 8, wherein the hook engagement member includes plurality of openings for receiving the plurality of hooks when the hook engagement member is engaged with the plurality of hooks.

12. The case as claimed in claim 8, wherein the access panel further comprises a tab, the spring member being coupled to the tab.

13. The case as claimed in claim 12, wherein the spring member comprises a plate formed of spring steel cantilevered between the tab and the hook engagement member.

14. The case as claimed in claim 8, wherein each of the hooks has one of a generally half conical cross-section, a generally half hyperboloidal cross-section, and a generally half paraboloidal cross-section.

15. The case as claimed in claim 8, further comprising a hook member mounted to the access panel opposite the latch assembly for engaging the chassis, the hook member cooperating with the latch assembly for securing the access panel to the chassis.

16. A case for an electronic device, comprising:
   a chassis for enclosing components of the electronic device, the chassis having an opening for providing access to the enclosed components;
   an access panel for covering the opening in the chassis; and
   a latching mechanism for securing the access panel to the chassis, the latching mechanism including:
      a plurality of hooks generally equally spaced along an edge of the chassis,
      a hook engagement member having a plurality of openings spaced therein for engaging the plurality of hooks to secure the access panel to the chassis,
      a plurality of spring members coupling the hook engagement member to the access panel, the plurality of spring members being capable of flexing between a first position wherein the hook engagement member is engaged with the plurality of hooks and a second position wherein the hook engagement member is disengaged from the plurality of hooks, and
      a handle assembly coupled to at least one of the hook engagement member and at least one of the spring members for flexing the plurality of spring members,
   wherein the handle assembly is actuated for flexing the plurality of spring member from the first position to the second position for allowing the access panel to be removed from the chassis.

17. The case as claimed in claim 16, wherein, when the handle assembly is actuated, the hook engagement member is disengaged from the hook while the access panel remains closed.

18. The case as claimed in claim 17, wherein the handle assembly is actuated via a force applied thereto in a direction generally away from the chassis, and wherein the access panel remains closed until an additional force is applied to the handle in a direction generally away from the chassis.

19. The case as claimed in claim 16, wherein the access panel further comprises a plurality of tabs, each of the plurality of spring members being coupled one of the plurality of tabs.

20. The case as claimed in claim 19, wherein each of the plurality of spring members comprises a plate formed of spring steel cantilevered between one of the plurality of tabs and the hook engagement member.

21. The case as claimed in claim 8, further comprising a plurality of hook members mounted to the access panel opposite the latch assembly for engaging the chassis, the plurality of hook members cooperating with the latch assembly for securing the access panel to the chassis.

22. A latching mechanism for securing an access panel to a chassis of an electronic device, comprising:

means for engaging a plurality of hooks coupled to the chassis to secure the access panel to the chassis, means for coupling the hook engaging means to the access panel, the coupling means being capable of flexing between a first position wherein the hook engaging means is engaged with the and a second position wherein the hook engaging means is disengaged from the hook, and means, coupled to at least one of the hook engaging means and the coupling means, for flexing the coupling means, wherein the flexing means is actuated for flexing the coupling means from the first position to the second position for disengaging the hook engaging means from the hook to allow the access panel to be removed from the chassis.

23. The latching mechanism as claimed in claim 22, wherein, when the flexing means is actuated, the hook engaging means is disengaged from the plurality of hooks while the access panel remains closed.

24. The latching mechanism as claimed in claim 23, wherein the flexing means is actuated via a force applied thereto in a direction generally away from the chassis, and wherein the access panel remains closed until an additional force is applied to the flexing means in a direction generally away from the chassis.

25. A latching mechanism for securing an access panel to a chassis of an electronic device, comprising:

a hook engagement member for engaging a hook coupled to the chassis to secure the access panel to the chassis;

a spring member coupled to a tab included on the access panel for coupling the hook engagement member to the access panel, the spring member being capable of flexing between a first position wherein the hook engagement member is engaged with the hook and a second position wherein the hook engagement member is disengaged from the hook; and a handle assembly coupled to at least one of the hook engagement member and the spring member for flexing the spring member, wherein the handle assembly is actuated for flexing the spring member from the first position to the second position for disengaging the hook engagement member from the hook to allow the access panel to be removed from the chassis.

* * * * *